US008509096B2

(12) United States Patent
Natan et al.

(10) Patent No.: US 8,509,096 B2
(45) Date of Patent: Aug. 13, 2013

(54) METHOD AND APPARATUS FOR ACTIVATING A WIRELESS COMMUNICATION DEVICE

(75) Inventors: Eetay Natan, Ramat Gan (IL); Avishay Sharaga, Beit Nehemya (IL)

(73) Assignee: Intel Corporation, Santa Clara, CA (US)

( * ) Notice: Subject to any disclaimer, the term of this patent is extended or adjusted under 35 U.S.C. 154(b) by 682 days.

(21) Appl. No.: 12/536,788

(22) Filed: Aug. 6, 2009

(65) Prior Publication Data
US 2011/0032869 A1 Feb. 10, 2011

(51) Int. Cl.
*H04J 1/16* (2006.01)
*H04J 3/14* (2006.01)
*H04L 1/00* (2006.01)
*H04L 12/26* (2006.01)

(52) U.S. Cl.
USPC ............................ 370/250; 370/241; 370/310

(58) Field of Classification Search
USPC ................. 709/220, 228; 713/1; 717/168; 455/422.1; 370/241, 250, 310, 328
See application file for complete search history.

(56) References Cited

U.S. PATENT DOCUMENTS

| 2007/0021113 | A1 | 1/2007 | Hamasaki et al. | |
| 2007/0169093 | A1 | 7/2007 | Logan et al. | |
| 2008/0062900 | A1 | 3/2008 | Rao | |
| 2009/0292909 | A1 * | 11/2009 | Feder et al. | 713/1 |

FOREIGN PATENT DOCUMENTS

| WO | 2006016255 | A1 | 2/2006 |
| WO | 2006018707 | A1 | 2/2006 |
| WO | 2009008977 | A2 | 1/2009 |
| WO | 2009088595 | A2 | 7/2009 |
| WO | 2011/016987 | A2 | 2/2011 |
| WO | 2011/016987 | A3 | 4/2011 |

OTHER PUBLICATIONS

International Search Report and Written Opinion Received for PCT Patent Application No. PCT/US2010/042458, Mailed on Jan. 28, 2011, 11 pages.
International Preliminary Report on Patentability Received for PCT Patent Application No. PCT/US2010/042458, Issuance date Feb. 7, 2012, 7 pages.
2012-523632, "Office Action received for JP. Patent Application No. 2012-523632, mailed on Apr. 30, 2013", 4 pages.
099123298, "Office Action received for Taiwan Patent Application No. 099123298, mailed on May 15, 2013", 14 pages including 7 pages of english translation.

* cited by examiner

*Primary Examiner* — Steven H Nguyen
*Assistant Examiner* — Adam Duda
(74) *Attorney, Agent, or Firm* — Cool Patent, P.C.

(57) ABSTRACT

A method and apparatus to activate over the air a wireless communication device by using a client-initiated bootstrap server and without the use of a provisioning server, a provisioning session and a provisioning protocol implementation at one or more servers of the wireless network. The client-initiated bootstrap server sends a bootstrap script and/or document to the wireless communication device to set an activation flag with commands included in the bootstrap scrip.

18 Claims, 5 Drawing Sheets

METHOD AND APPARATUS FOR ACTIVATING A WIRELESS COMMUNICATION DEVICE

BACKGROUND OF THE INVENTION

A wireless wide area network (WWAN) may be operated according to an IEEE 801.16 standard which may also be referred as a WiMAX. The WiMAX network may perform an over-the-air (OTA) procedure of subscription, activation and provisioning of WiMAX devices. The procedure may include two or more phases and may involve a provisioning server and WiMAX Initial Bootstrap (WIB) server. For example, the first step of the subscription and provisioning phase may be bootstrapping for providing a provisioning client with the name, address and credentials of the server and for instantiating the first management session, if desired. With the successful execution of the bootstrapping process, a secure session between the WiMAX device, a device manager (DM) client and the DM server may be established and the provisioning process for the device may begin. The need for at least two or more servers may be expensive to service provider operators. Thus, there is a need to reduce the cost of the servers and stile may be able to achieve activation and provisioning of WiMAX device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
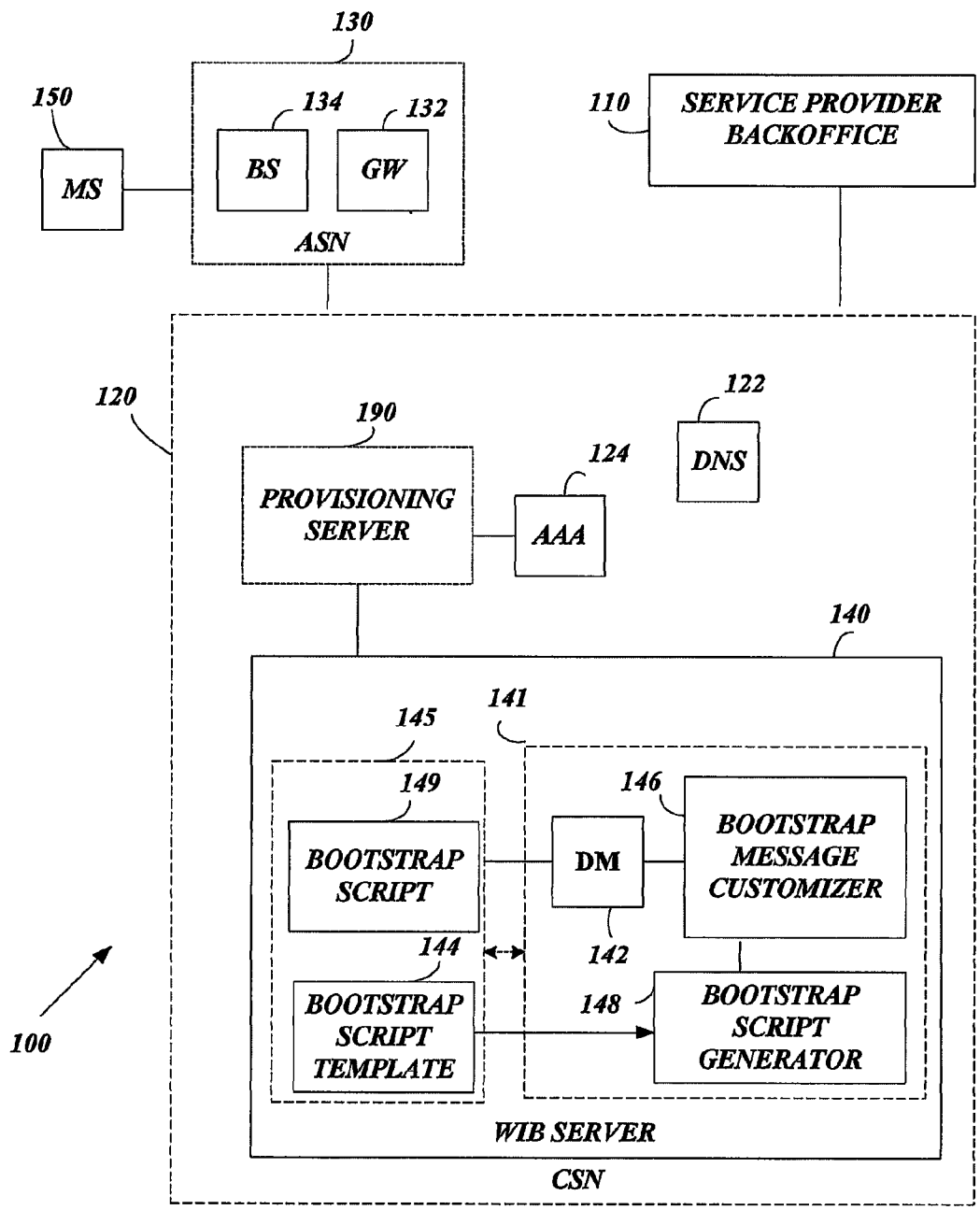
FIG. 1 is an illustration of a portion of a wireless communication system according to some exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals. These algorithmic descriptions and representations may be the techniques used by those skilled in the signal processing arts or/and in wireless communication arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer and/or computing system and/or medium access controller (MAC) and/or communication processor, or similar electronic computing device, that manipulate and/or transform data represented as physical, such as electronic, quantities within the computing system's registers and/or memories into other data similarly represented as physical quantities within the computing system's memories, registers or other such information storage, transmission or the like. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as communication devices of a radio system. The communication devices intended to be included within the scope of the present invention include, by way of example only, mobile stations, base stations and access points of radio systems such as, for example wireless local area network (WLAN) which also may be referred as WiFi, wireless metropolitan area network (WMAN) which also may be referred as WiMAX, a wireless personal area network (WPAN) such as, for example Bluetooth™, two-way radio transmitters, digital system transmitters, analog system transmitters, cellular radiotelephone transmitters, digital subscriber lines, LTE cellular systems and the like.

Some embodiments of the invention may be implemented, for example, using a machine-readable medium or article which may store an instruction or a set of instructions that, if executed by a machine, cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, assembly language, machine code, or the like.

In accordance with embodiments of the invention, a channel may be a physical transfer medium. The physical transfer medium may be used to transfer signals such as, for example, informative data signals, training signals, pilot signals, subcarriers signals, preamble signals and the like, that may be modulated by one or more modulation scheme. Furthermore, the channel may be a combination of the physical transfer medium, components of the transmitter and/or the receiver, for example path loss, noise, interference or the like. It should be understood to the skilled artisan that embodiments of the invention may operate with many types of signals, which partially mention above, and the invention is in no way limited to the above mentioned signals.

Definitions of some components that may be related to embodiment of the invention will be presented. A bootstrap initiator server, for example a WiMAX initial Bootstrap (WIB), server may be defined as a functional entity that enforces the over the air (OTA) protocol for a particular domain of a computer network or the like. The WIB server may store the configuration bootstrap information, may act as a proxy to deliver the bootstrap information, or may redirect a wireless mobile device to another server that is able to deliver the bootstrap information.

A provisioning client may be defined, according to some embodiments of the invention, as an agent in a wireless mobile device, for example a WiMAX device. For example, the provisioning client may be defined as an extension of a provisioning protocol to support requirements specified in WiMAX standards such as, for example Open Mobile Alliance (OMA) standard body, IEEE 802.16 or the like. For devices that support an OMA device manager (DM) based activation and provisioning, the provisioning client may support the WiMAX OTA Provisioning and Activation based on OMA device manager (DM), as specified in WiMAX's OTA provisioning standard, if desired.

According to embodiments of the present invention, a provisioning server may be defined as a server for communicating with the wireless communication device using a desired provisioning protocol during a provisioning process. Advantageously, embodiments of the present invention may eliminate the need for a full-featured provisioning server, although the scope of the present invention is not limited in this respect.

Turning first to FIG. 1 an illustration of a portion of a wireless communication system 100 according to exemplary embodiment of the invention is shown. Although the scope of the present invention is not limited to this embodiment wireless communication system 100, for example a WiMAX system or the like, may include a service provider back office 110, a Connectivity Service Network (CSN) 120, an Access Service Network (ASN) 130, and one or more wireless mobile devices 150.

According to embodiments of the invention, CSN 120 and/or a home agent (not shown) may include a Domain Name Server (DNS) 122 an Authentication, Authorization and Accounting (AAA) server 124, a WIB server 140, and a provisioning server 190. ANS 130 may include a gateway (GW) 132 and a base station (BS) 134. According to one example, WIB server 140 may based on Hypertext Transfer Protocol (http) and may include a WEB server (not shown) and/or HTTP server (not shown) According to other example WIB server 140 may include DM 142 a bootstrap script template 144, a bootstrap message customizer 146 and a bootstrap script generator 148 to generate a bootstrap script and/or document 149, although the scope of the present invention is not limited in this respect. In some other embodiments of the invention ASN 124 may include DNS 122, although the scope of the present invention is not limited in that respect.

In another embodiment of the invention WIB server 140 may include a processor 141 and a memory 145, both shown in dotted lines. According to this exemplary embodiment processor 141 may include DM 142, bootstrap message customizer 146 and bootstrap script generator 148. Memory 145 may include bootstrap script template 144 and bootstrap script and/or document 149. According to one example, DM 142, bootstrap message customizer 146 and bootstrap script generator 148 may be software modules executed by processor 141. According to another example DM 142, bootstrap message customizer 146 and bootstrap script generator 148 may be implemented by software and/or by hardware and/or any combination of hardware and software.

Embodiments of the present invention may allow or achieve a full provisioning of a WiMAX client (e.g., MS 150) without the need for, or without using, provisioning server 190 (shown in dotted), a provisioning session and other provisioning protocols implementation on a network side such as, for example OMA DM or the like.

A first exemplary embodiment of the invention, DM 142 may configure and use an OMA DM bootstrap script, for example bootstrap script 149, to achieve a full provisioning of a wireless mobile device (e.g., MS 150) without requiring provisioning server 190 and/or OMA DM protocol stack. A second exemplary embodiment of the invention may include producing regularly DM bootstrap scripts and customizing the scripts per a particular device, if desired. A third exemplary embodiment of the invention may include using a MAC address during a WIB procedure to allow WIB server 140, for example using bootstrap message customizer 145, to customize a DM bootstrap message per device and/or per a device manufacturer, although the scope of the present invention is not limited to the above described exemplary embodiments.

Figure 2:
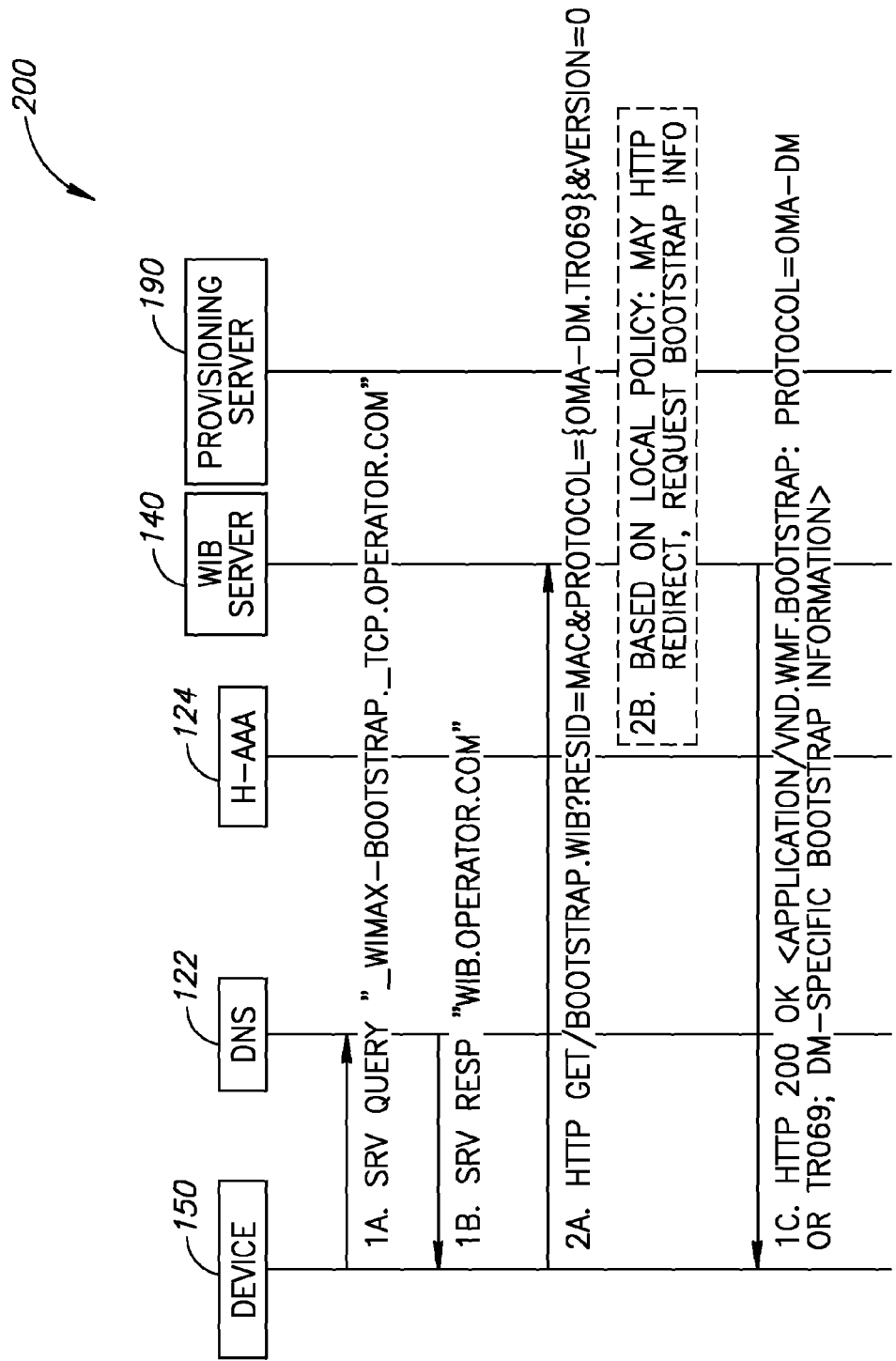
FIG. 2 is an illustration of an example of a bootstrap flow in a wireless communication system of FIG. 1 according to an exemplary embodiment of the invention.

Turning to FIG. 2 an illustration of an example of a provisioning flow in a wireless communication system of FIG. 1 according to an exemplary embodiment of the invention is shown. Although the scope of the present invention is not limited in this respect, a bootstrap and provisioning process may start with MS 150 performs a service (SRV) query (e.g., stage 1a). For example, MS 150 may send to DNS 122 "wimax-bootstrap_tcp.operator.com" to resolve the location of WIB server 140 upon Internet Protocol (IP) session establishment. For example, the service in the SRV query may be "wimax-bootstrap", the protocol may be "tcp", and the "operator" may be the domain of a target NSP (if available). DNS Server 122 may resolve the domain name of WIB Server 140 of the NSP, for example a default NSP, and may send the domain name of WIB server 140 to MS 150 (e.g., stage 1.b).

Continuing with this exemplary embodiment, MS 150 may open a hypertext transfer protocol (HTTP) session to WIB server 140 to inform WIB server of supported protocols (e.g., DM OTA protocol(s)), and may retrieve a bootstrap information, if desired.

According to one exemplary embodiment MS 150 may use a "HTTP GET" method with the Request Universal Resource Identifier (URI) for example, "/bootstrap.wib?msid=MAC&protocol={OMA-DM, TR069} &version=0" (e.g., stage 2a). MS 150 may provide the MAC address in the URI using the MSID query parameter and may indicate the WIB HTTP protocol version in the URI using the "version" parameter, if desired. In stage 2b (see dotted box), WIB server 140 may re-direct a HTTP request to another server such as, for example provisioning server 180 and/or any proprietary server (not shown) based on an operator desired policy, although the scope of the present invention is not limited to this exemplary stage. In addition, within the HTTP session, WIB server 140 may configure bootstrap script and/or document 149 that include commands and information to execute on chosen nodes (e.g., stage 2c).

For example, WIB server 140 may use bootstrap script generator 148 and bootstrap script template 144 to configure bootstrap script and/or document 149, if desired. Bootstrap script 149 may be configured to contain commands for creating an entire MS 150 (e.g., WiMAX device) configuration for the provisioning of the Network Service Provider (NSP). For example bootstrap script 149 may be known in the WiMAX art and/or the OTA standard as "WiMAX_Supp MO." A WiMAX Supp MO is shown in detail with FIG. 4, although the scope of the present invention is not limited in this respect. "WiMAX_Supp MO" may be in addition to, or instead of, the WiMAX OTA which may include OMA DM bootstrap commands (called "DMAcc MO") setup.

According to another embodiment of the invention, instead of configuring a provisioning client with how to contact provisioning server 190 (e.g. DMAcc MO information), DM bootstrap script and/or document 149 may include all the commands that would have otherwise be issued during an OMA DM session, if desired.

According to some exemplary embodiments of the invention WIB server 140 may deliver the DM bootstrap document to MS 150, if desired. For example, WIB server 140 may send the bootstrap script and/or document via a data packet for example, a user datagram protocol (UDP) packet that may increase data push capabilities of WIB server 140, if desired. According to this exemplary embodiment of the invention, the data packet may include the generated bootstrap script and/or document (e.g., bootstrap script 149) and may be delivered to the MS 150 upon notification from AAA server 124, if desired.

During generation of the DM bootstrap, bootstrap message customizer 146 may know where a WiMAX support management object (MO) resides on a desired provisioning client. According to some exemplary embodiment of the invention, the WiMAX support MO may be different from manufacturer to manufacturer. This may be resolved by customizing/generating the DM bootstrap script and/or document per a MAC address of a targeted MS, for example, MS 150, although it should be understood that the present invention is not limited to this example.

Figure 3:
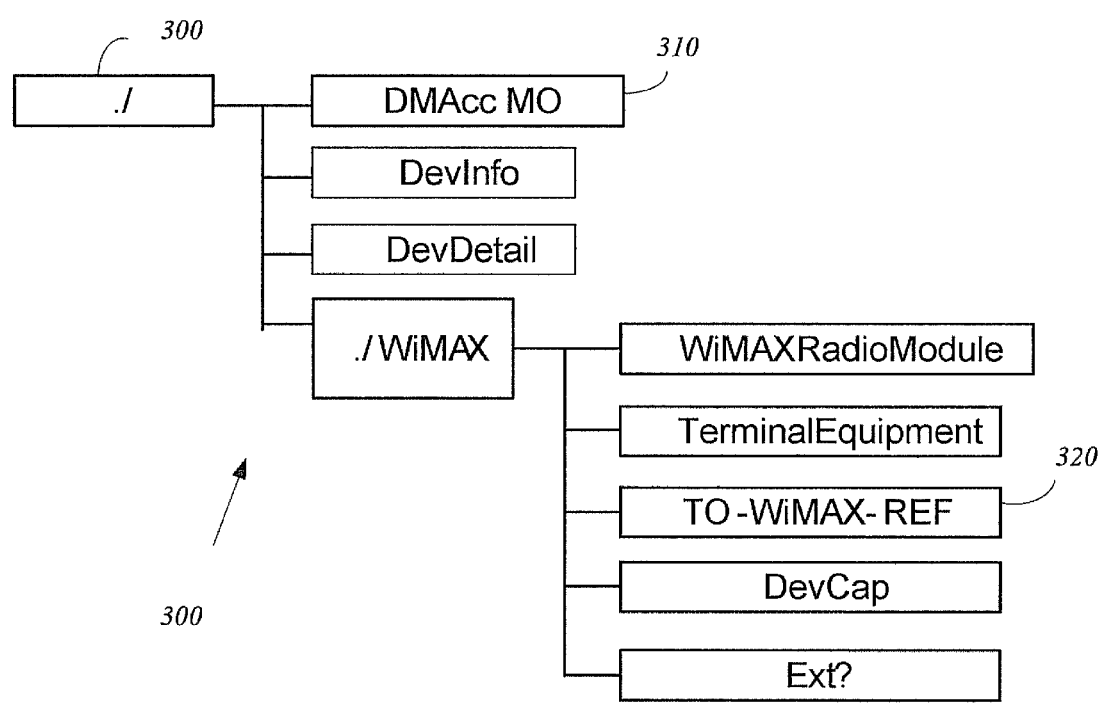
FIG. 3 is a an Open Mobile Alliance Device Manager (OMA DM) provisioning tree, according to one exemplary embodiment of the invention embodiments of the invention.

Turning to FIG. 3 is an OMA DM provisioning tree 300, according to one exemplary embodiment of the invention embodiments of the invention is shown. According to this example DMAcc MO 310 may be created by the bootstrap script and/or document, although embodiments of the present invention are not limited to this respect. An additional tree may be created at the root (text box 300) and may have reference at TO-WiMAX-REF (text box 320), if desired.

Figure 4:
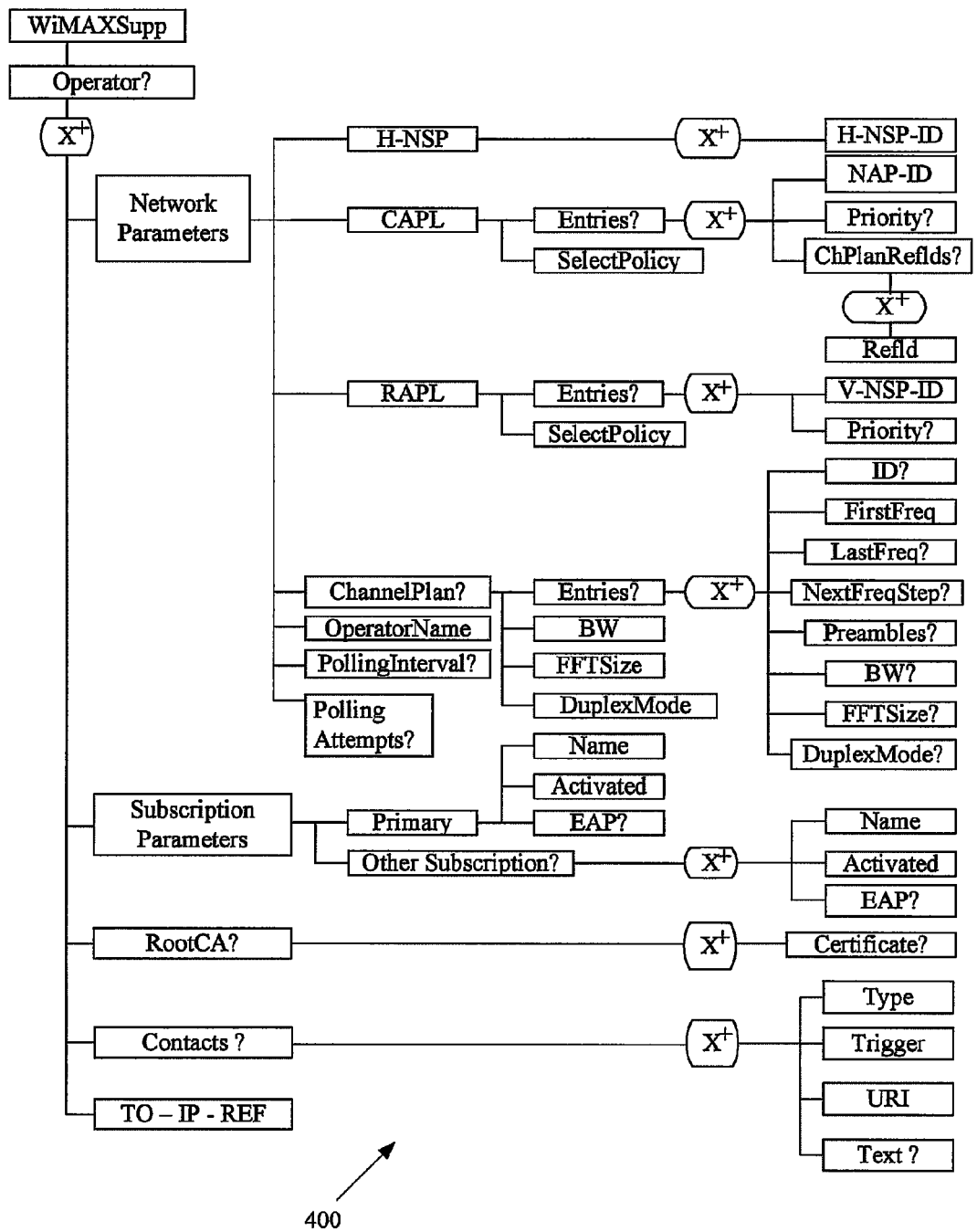
FIG. 4 is a branch of the OMA DM provisioning tree of FIG. 3 created by commands of a bootstrap script, according to one exemplary embodiment of the invention.

Turning to FIG. 4, a branch 400 of the OMA DM provisioning tree of FIG. 3 created by commands of a bootstrap script, according to one exemplary embodiment of the invention is shown. According to this example branch 400 may be created by extended commands for example, OMA-DM based add/replace commands for all and/or some of the leaf nodes in branch 400 that were included in the bootstrap script and/or document, although the scope of the present invention is not limited in this respect.

Figure 5:
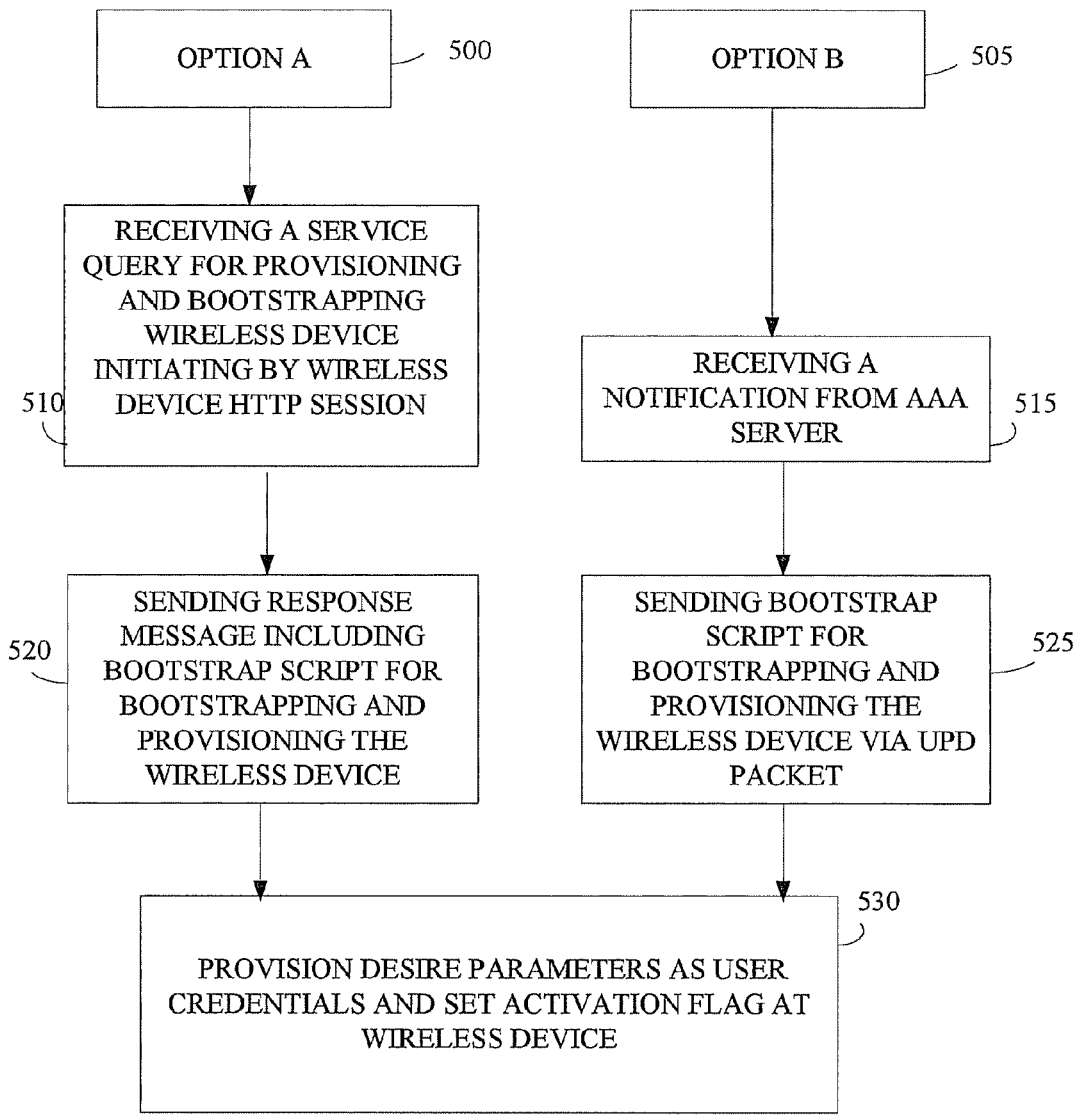
FIG. 5 is a flowchart of a method of activating a wireless communication device according to exemplary embodiments of the invention.

Turning to FIG. 5 a flow chart of a method of activating and provisioning a wireless communication device, according to exemplary embodiments of the invention is shown. According to this example method, the method may include activating wirelessly, via radio signals, (e.g. over the air) said wireless communication device by using a client-initiated bootstrap server (e.g., WIB server 140). WTB server 140 may set an activation flag (e.g., by using the bootstrap script/document) of said wireless device without using a provisioning server, a provisioning session and a provisioning protocol implementation at one or more servers of the wireless network.

According to one embodiment of the invention, options for activating and provisioning the wireless device may include option A (text box 500) and option B (text box 505). Option A may be used when WIB server 140 is asked for bootstrap and option B may be used when Authorization and Accounting (AAA) server 124 notifies WIB server 140 regarding new wireless device (e.g., MS 150) to join the network, if desire.

More particularly, according to option A, the wireless communication device may initiate a HTTP session which includes a service query for provisioning and bootstrapping. The WIB server 140 may receive the service query (text box 510) and may send a response message including a bootstrap script that includes activation and provisioning commands (text box 520).

According to option B (text box 505), WIB server 140 may receive a notification from AAA server (text box 515) and may send the bootstrap script via a user datagram protocol (UDP) packet, if desired (text box 525). WIB server 140 may provision desired parameters as user credentials at the wireless mobile device with commands provide by the bootstrap script and/or document and may set at the wireless communication device an activation flag (text box 530), although the scope of the present invention is not limited to this example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of activating and provisioning a wireless communication device, comprising:
   receiving a notification from an Authentication, Authorization and Accounting (AAA) server sent to an initial bootstrap server;
   activating and provisioning said wireless communication device by using the initial bootstrap server to set an activation flag of said wireless communication device without using a provisioning server, a provisioning session and a provisioning protocol that is implemented at one or more servers of a wireless network by sending the bootstrap script via a user datagram protocol (UDP) packet; and
   wherein the initial bootstrap server customizes the bootstrap script for the wireless communication device using the media access control (MAC) address of the device.

2. The method of claim 1, wherein the activating and provisioning comprises:
   receiving from said wireless device a service query for provisioning and bootstrapping said wireless device; and
   sending a response message including a bootstrap script that includes activation and provisioning commands.

3. The method of claim 2, comprising:
   receiving and sending bootstrap commands over a hypertext transfer protocol (HTTP) session initiated by said wireless device.

4. The method of claim 1, comprising:
   activating and provisioning the wireless communication device with commands provided by the bootstrap script.

5. An apparatus comprising:
   an initial bootstrap server to set an activation flag of a wireless communication device without using a provisioning server, a provisioning session and a provisioning protocol implementation at one or more servers of a wireless network;

wherein the initial bootstrap server is able to receive a notification from an Authentication, Authorization and Accounting (AAA) server and to send a bootstrap script via a user datagram protocol (UDP) packet;

wherein the initial bootstrap server is configured to customize the bootstrap script for the wireless communication device using the media access control (MAC) address of the device.

6. The apparatus of claim 5, wherein the initial bootstrap server is able to receive from said wireless communication device a service query for provisioning and bootstrapping said wireless communication device and to send a response message including a bootstrap script that includes activation and provisioning commands.

7. The apparatus of claim 5, wherein the initial bootstrap server is able to receive and send bootstrap commands over a hypertext transfer protocol (HTTP) session initiated by said wireless communication device.

8. The apparatus of claim 5, wherein the initial bootstrap server is able to provision the wireless communication device with commands provided by the bootstrap script.

9. The apparatus of claim 5, wherein the initial bootstrap server comprises:
a bootstrap script generator to generate a bootstrap script based on a bootstrap script template; and
a device manager to configure and to use said bootstrap script to achieve a full provisioning of a wireless mobile device.

10. A wireless communication system comprising:
an initial bootstrap server to set an activation flag of a wireless communication device without using a provisioning server, a provisioning session and a provisioning protocol implementation at one or more servers of a wireless network;
wherein the initial bootstrap server is able to receive a notification from an Authentication, Authorization and Accounting (AAA) server and to send a bootstrap script via a user datagram protocol (UDP) packet;
wherein the initial bootstrap server is configured to customize the bootstrap script for the wireless communication device using the MAC address of the device.

11. The wireless communication system of claim 10, wherein the initial bootstrap server is able to receive from said wireless communication device a service query for provisioning and bootstrapping said wireless communication device and to send a response message including a bootstrap script that includes activation and provisioning commands.

12. The wireless communication system of claim 10, wherein the initial bootstrap server is able to receive and send bootstrap commands over a hypertext transfer protocol (HTTP) session initiated by said wireless communication device.

13. The wireless communication system of claim 10, wherein the initial bootstrap server is able to provision the wireless communication device with commands provided by a bootstrap script.

14. The apparatus of claim 10, wherein the initial bootstrap server comprises:
a bootstrap script generator to generate a bootstrap script based on a bootstrap script template; and
a device manager to configure and to use said bootstrap script to achieve a full provisioning of a wireless mobile device.

15. An initial bootstrap server for activating and provisioning a wireless communication device comprising:
a memory to store a bootstrap script template operably coupled to a processor that generates a bootstrap script wherein said bootstrap script when executed, results in:
receiving a notification from an Authentication, Authorization and Accounting (AAA) server sent to the initial bootstrap server; and
activating and provisioning said wireless communication device by using the initial bootstrap server to set an activation flag of said wireless communication device without using a provisioning server, a provisioning session and a provisioning protocol that is implemented at one or more servers of a wireless network by sending the bootstrap script via a user datagram protocol (UDP) packet;
wherein the initial bootstrap server is configured to customize the bootstrap script for the wireless communication device using the MAC address of the device.

16. The initial bootstrap server of claim 15, wherein the activating and provisioning when executed, results in:
receiving from said wireless communication device a service query for provisioning and bootstrapping said wireless communication device; and
sending a response message including a bootstrap script that includes activation and provisioning commands.

17. The initial bootstrap server of claim 16, wherein said bootstrap script when executed, results in:
receiving a request for provisioning and sending bootstrap commands over a hypertext transfer protocol (HTTP) session initiated by said wireless communication device.

18. The initial bootstrap server of claim 16, wherein said bootstrap script when executed, results in:
activating and provisioning the wireless communication device with commands provided by the bootstrap script.

* * * * *